Patented Nov. 28, 1939

2,181,129

UNITED STATES PATENT OFFICE 2,181,129

ADHESIVE

Albert J. Heberer, Maywood, Ill., assignor to The Glidden Company, Cleveland, Ohio, a corporation of Ohio No Drawing. Application January 21, 1936, Serial No. 60,135

4 Claims. (Cl. 134—23.1)

This invention relates to adhesives, in particular those used for the coating of decalcomania transfers, and has particular reference to a new and novel glue adhesive characterized by exceptional coating properties, and non-adhesiveness when dry, these properties being obtained by the incorporation of phosphatides, particularly vegetable lecithin, into the adhesive.

In the manufacture of decalcomania transfers, a sheet of paper, coated in some way so that it will separate from the decalcomania proper upon wetting, is coated with paint and/or lacquer, to form a design, which may be applied by printing or the like. Depending on whether the transfer is to be applied to the inside of glass or other transparent body, or to the outside of a surface, the overcoating, printing and body color are placed in one order, or in reverse. It is desirable to then coat the finished transfer with an adhesive, so that it may be fixed in place without first smearing the surface to be covered with the necessary binder.

Because of the fact that these transfers are made far in advance, and may not be used for several years thereafter, all the materials used must be extremely resistant to changes in aging. Extreme flexibility is likewise required, as in the process of application; this property is valuable to ensure proper results. These factors, together with the fact that the adhesive must be capable of adhesion to paint or lacquer, and to surfaces such as wood, glass, metal, and masonry, places unusual demands on an adhesive. As the adhesive is the last coating applied, and is often placed over bleeding color coats such as para red and the like, it is likewise important that the adhesive have no bleeding effect on these pigments.

Proper spreading is, of course, a prime necessity; and this is all the more important because the surface to be coated is often a very greasy oil film, over which most water-soluble adhesives tend to form discontinuous films, depositing in so-called "islands." This phenomenon of "islanding" is very prevalent with most of the prior art adhesives, as used on decalcomanias.

Another desirable property, heretofore considered unattainable without sacrifice of other vital properties, is lack of adhesives while dry. This property is especially desirable with decalcomania adhesives, because the decalcomania transfers are always packed together in stacks, like so many sheets of paper; and they evidence a considerable tendency to adhere to each other, so that they must be separated by careful stripping of the top transfer from the pile.

Decalcomania adhesives which overcome the objection to most prior art adhesives comprise solutions in water of glue, a plasticizer, and a water-soluble blending volatile solvent less volatile than water, as described and claimed in the co-pending Dexheimer application Serial #23,706, filed May 27, 1935, which has matured into Patent Number 2,143,868, of January 17, 1939. The blend disclosed therein of glue, glycerol and the monobutyl ether of ethylene glycol, is permanently elastic, non-bleeding, and possesses good adhesion to most decalcomania transfers. Because of its adhesion to most lacquers and paints used, islanding occurs but seldom; but in exceptional cases, where the adhesive is applied to especially greasy undercoats, or where the ordinary undercoats have been allowed to dry for too long a period, islanding occurs. These adhesives likewise possess the objection common to other glue adhesives—the tendency to adhere when stacked together.

An attempt was made to overcome the islanding by the incorporation of various wetting agents, including various soaps, mahogany sulfonates, and various aryl sulfonates, without any great degree of success; incompatibility, loss of adhesiveness and/or inability to overcome islanding caused rejection of all these agents.

I have, however, discovered that the phosphatides, and particularly soya bean and similar vegetable lecithins, may be added to the decalcomania adhesive, with rather unusual results. The islanding is definitely overcome; and the lecithin acts as a further plasticizer for the glue, which action is not dependent on oil content; the adhesive properties of the glue when wetted are slightly bettered, as compared with poorer results obtained with most wetting agents; and, most important of all, the dry glue coated decalcomanias seem to have an oily top surface which overcomes the tendency to sticking now prevalent, so that with my new adhesives, transfers can be slid off the top of a pile.

As a preferred form of my invention, I use the following:

| | Pounds |
|---|---|
| Water | 30 |
| Hide glue | 6 |
| Glycerol | 1 |
| Monobutyl ether of ethylene glycol | 4 1/16 |
| Soya bean lecithin (technical grade containing 30% soya oil) | 1/2 |

The lecithin is dissolved separately in a small percentage of water, and half the glycol ether is added. The rest of the formula is made up separately, and the two are blended.

While I have disclosed the preferred form of my invention, lecithin and other phosphatides may be added to other adhesives, with great improvement, even though the resultant adhesive may not be as satisfactory for decalcomania work as my preferred formula. In general, plasticized glues containing lecithin, in addition to water-soluble blending solvents, may be used for decalcomania work; the solvents should be less volatile than water, if good flow is desired. Any of the plasticizers disclosed in the Dexheimer application, S. N. 23,706, may be used, such as glycerol, glycol, glucose, etc. Likewise, any of the solvents less volatile than water, such as the glycol and polyglycol ethers, lactates, etc., as disclosed in the Dexheimer application may be used.

Moreover, lecithin may be incorporated into ordinary unplasticized or plasticized glues, with improvement in properties. In the case of ordinary glue solutions in water, lecithin acts as a plasticizer, increasing the flexibility of the film; it improves the spreading tremendously; and it increases the adhesiveness of the glue while moist, while at the same time reducing its stickiness after drying. For these reasons, lecithin makes an excellent addition to glue adhesives used for various purposes. Varying percentages of lecithin may be used; even rather small additions help the properties. I prefer to add between 5 and 20%, based on the glue content.

I claim:

1. An adhesive composition comprising glue as the major non-volatile ingredient, a plasticizer for the glue, a water soluble blending volatile solvent for the glue, less volatile than water, and 5 to 20% of a phosphatide based on the glue, incorporated therein.

2. An adhesive composition comprising glue as the major non-volatile ingredient, a plasticizer for the glue, a water soluble blending volatile solvent for the glue, less volatile than water, and 5-20% of lecithin based on the glue incorporated therein.

3. An adhesive composition comprising a solution of glue in water, glycerol, the monobutyl ether of ethylene glycol, and 5 to 20% of a phosphatide based on the glue, the glue being the major non-volatile ingredient.

4. An adhesive composition comprising a solution of glue in water, a plasticizer selected from the class consisting of glycerol, glycol, and glucose, a water soluble volatile solvent for the glue, less volatile than water, selected from the class consisting of glycol ethers and polyglycol ethers, and from 5 to 20% of phosphatide based on the glue.

ALBERT J. HEBERER.